(12) United States Patent
Levien et al.

(10) Patent No.: US 6,874,236 B2
(45) Date of Patent: Apr. 5, 2005

(54) CULINARY PEELER

(75) Inventors: Robin Levien, London (GB); Anthony Harrison-Griffin, Gloucestershire (GB)

(73) Assignee: MaxPat Trading & Marketing (Far East) Limited (HK)

( * ) Notice: Subject to any disclaimer, the term of this patent is extended or adjusted under 35 U.S.C. 154(b) by 0 days.

(21) Appl. No.: 10/602,308

(22) Filed: Jun. 24, 2003

(65) Prior Publication Data

US 2004/0003728 A1 Jan. 8, 2004

(30) Foreign Application Priority Data

Jun. 25, 2002 (GB) ............................................. 0214650

(51) Int. Cl.[7] .............................................. A47J 17/02
(52) U.S. Cl. ....................................... 30/279.6; 99/588
(58) Field of Search ................................ 30/123.5, 278, 30/279.6, 279.2; 99/588; D7/695

(56) References Cited

U.S. PATENT DOCUMENTS

| 1,667,596 A | * | 4/1928 | Kapota ....................... 30/279.6 |
| 2,178,028 A | * | 10/1939 | Adamec ...................... 30/279.6 |
| 2,235,323 A | * | 3/1941 | Maskulka et al. .......... 30/279.6 |
| 2,274,815 A | * | 3/1942 | Whann ........................ 30/279.6 |
| 2,362,896 A | * | 11/1944 | Gamache .................... 30/279.6 |
| 2,614,324 A | * | 10/1952 | Greenridge ................. 30/279.6 |
| 3,299,510 A | * | 1/1967 | Taormina .................... 30/279.6 |
| 5,865,110 A | * | 2/1999 | Yonezawa ..................... 99/588 |

FOREIGN PATENT DOCUMENTS

| DE | 29910161 | | 10/1999 |
| FR | 2216960 | | 9/1974 |
| GB | 0579525 | | 5/1944 |
| JP | 6-277141 | * | 10/1994 |
| JP | 2001-314316 | | 11/2001 |

\* cited by examiner

*Primary Examiner*—Hwei-Siu Payer
(74) *Attorney, Agent, or Firm*—Ostrolenk, Faber, Gerb & Soffen, LLP

(57) ABSTRACT

A culinary peeler having an elongate blade bent or curved in its lateral dimension having at least one longitudinal opening extending along its length with a sharp cutting region adjacent the opening, wherein the blade is of curved form in its longitudinal direction.

11 Claims, 7 Drawing Sheets

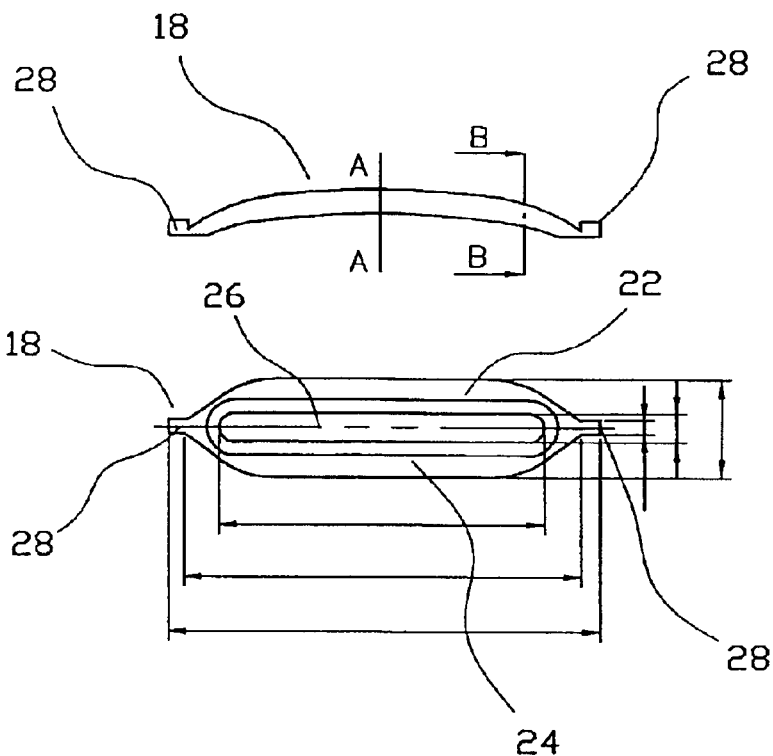
Fig.4
Fig.5
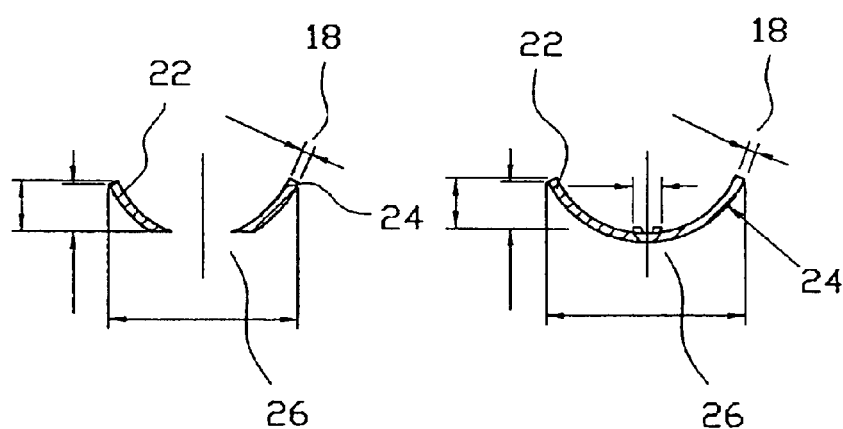
Fig.6  Fig.7

US 6,874,236 B2

CULINARY PEELER

BACKGROUND OF THE INVENTION

The present invention relates to a culinary peeler.

When preparing food for cooking, it is often necessary to remove the skin of the food beforehand. A wide variety of different configurations of peelers exist, but most suffer problems of being unable to be used effectively on a wide variety of different-shaped fruit and vegetables.

It is thus an object of the invention to provide a culinary peeler with which removing skin from different foodstuffs will become much easier, manageable and effective, or at least to provide a useful alternative to the food-preparing public.

SUMMARY OF THE INVENTION

According to present invention, there is provided a culinary peeler having an elongate blade bent or curved in its lateral dimension having at least one longitudinal opening extending along its length with a sharp cutting region adjacent the opening, wherein the blade is of curved form in its longitudinal direction.

This curved longitudinal blade form is able to contact and more effectively peel a wider strip of the fruit or vegetable, and one which is thinner, thus making the peeling process potentially faster and easier and leaving more of the fruit or vegetable.

In one preferred embodiment the blade has one longitudinal opening with a pair of opposed sharp cutting regions on opposite sides of the opening.

Suitably, the radius of curvature of the blade in the longitudinal direction may be in the range of 30 to 150 mm. In particular, a blade having a radius of curvature of about 100 mm is particularly effective for a wide variety of fruit and vegetables.

Suitably, the blade may also have a lateral curvature of 3 to 20 mm, and more particularly, the blade may have a lateral curvature of about 7 mm.

Advantageously, the blade may be pivotably secured at its opposite ends to allow a limited pivoting about its longitudinal axis. The blade may preferably be constrained to allow pivoting from a first position where one limb of the blade lies coplanar with and abutting a blade support, and a second position where the opposite limb lies coplanar with and abutting the blade support.

BRIEF DESCRIPTION OF THE DRAWINGS

The invention will now be described by way of examples only, with reference to the accompanying drawings, in which:

FIG. 4 is a side view showing a cutting blade of the peeler shown in FIG. 1;

FIG. 5 is a bottom view of the blade shown in FIG. 4;

FIG. 6 is a part cross-sectional view of the blade along line A—A of FIG. 4;

FIG. 7 is a cross sectional view of the blade along line B—B of FIG. 4;

DESCRIPTION OF PREFERRED EMBODIMENTS

Figure 1:
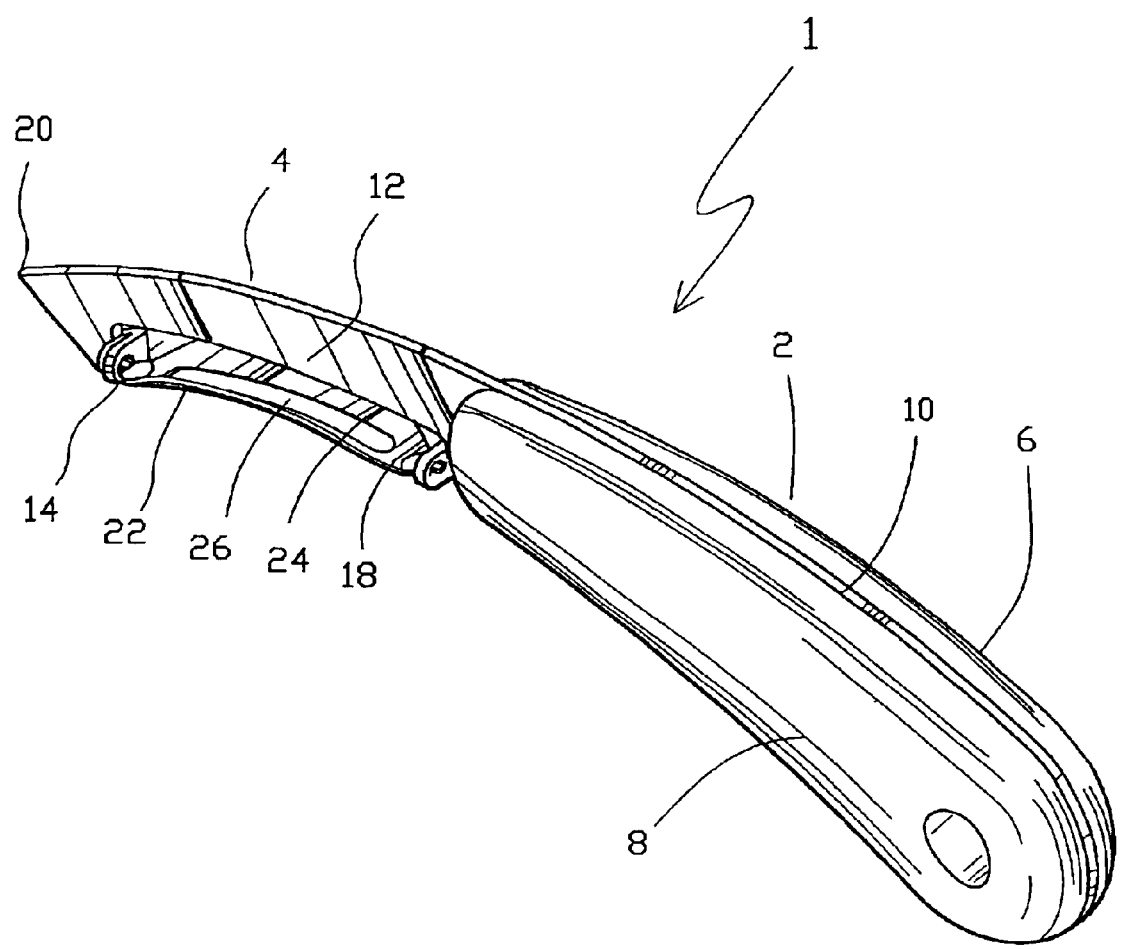
FIG. 1 is a perspective view showing a culinary peeler according to an embodiment of the present invention.
Figure 2:
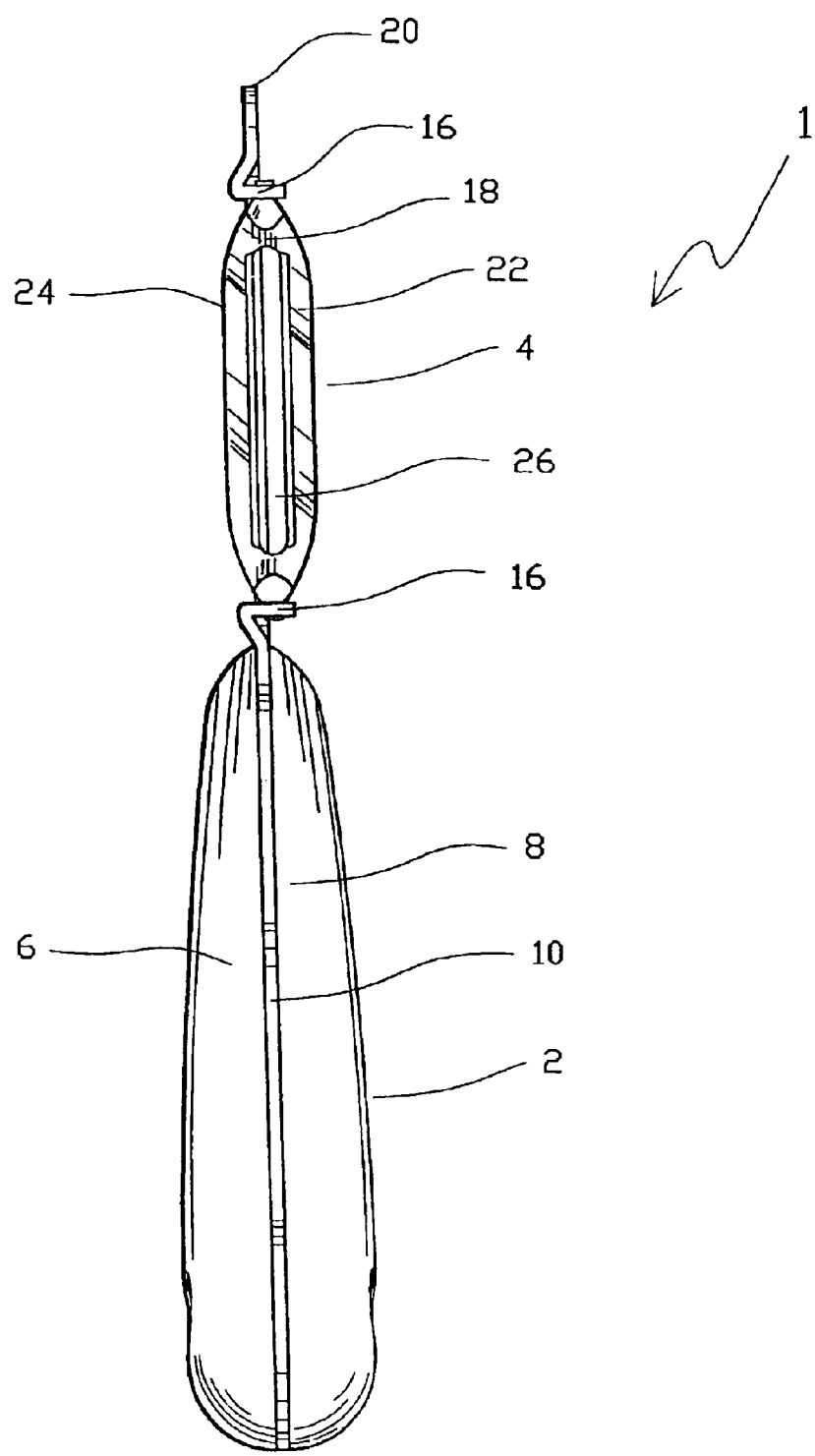
FIG. 2 is a bottom view showing the peeler shown in FIG. 1.
Figure 3:
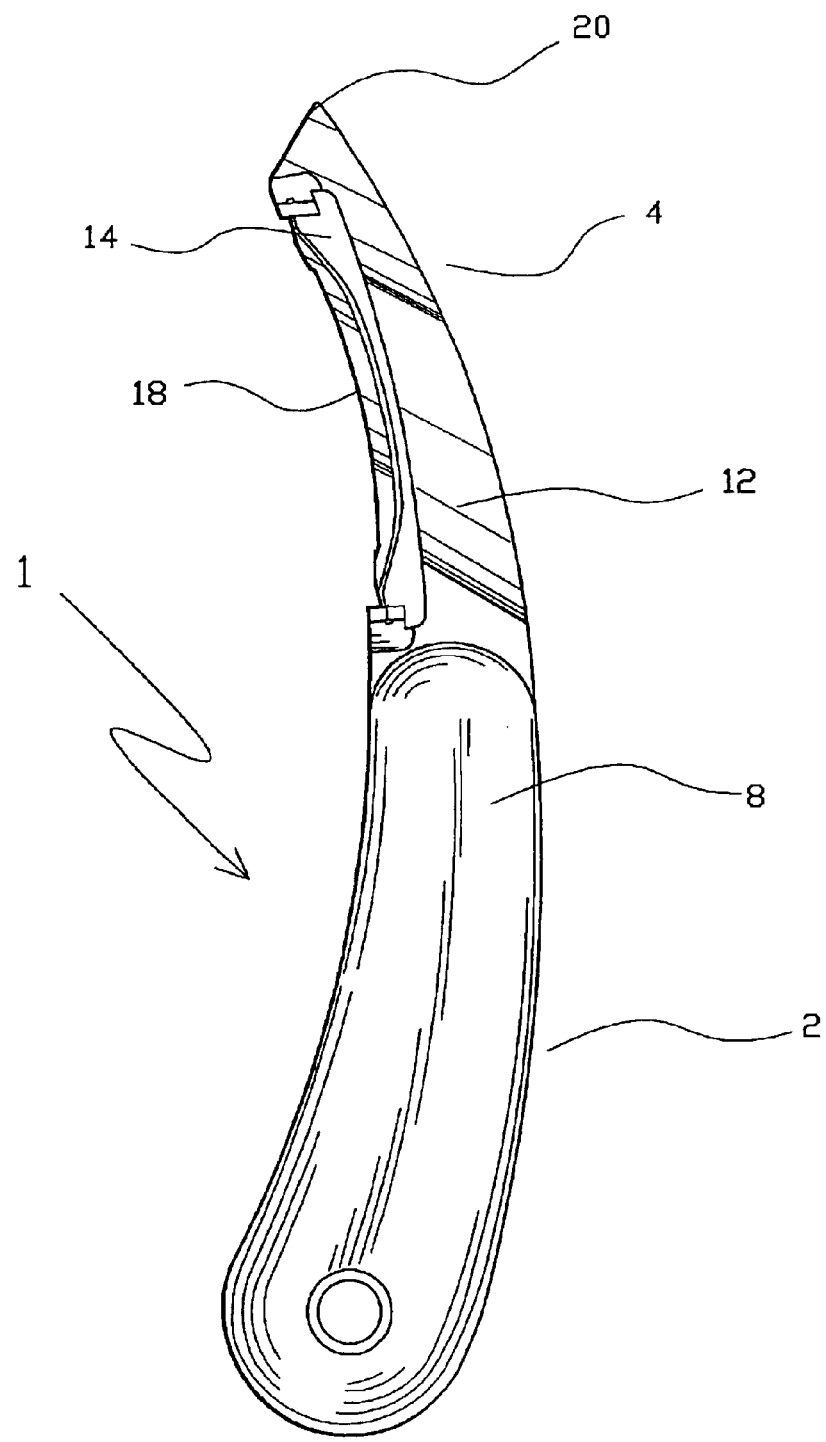
FIG. 3 is a side view showing the peeler shown in FIG. 1.

A first embodiment of a culinary peeler according to the present invention is shown in FIGS. 1 to 7, the peeler being generally designated as 1. Referring firstly to FIGS. 1 to 3, the peeler 1 is of relatively compact type which may be used both in a kitchen at home or in a restaurant or supermarket or grocery store.

The peeler 1 comprises a handle portion 2 sized to fit comfortably in a user's hand arranged at one end thereof and an elongate utility portion 4 arranged at the opposite end. The handle portion 2 includes two members 6, 8 secured to and sandwiching a leg 10 extending from the utility portion 4 and which is integral with the leg 10. It will be appreciated however that the utility portion 4 may be secured to the handle portion 2 in other suitable ways.

The utility portion 4 comprise a blade support 12 providing a cut-out area 14 on its underside. At opposite ends of the cut-out area 14 there are provided fingers 16, each of which has an opening for receiving and supporting an end of a cutting blade 18 which is generally elongate in shape. The fingers 16 are formed unitarily with the utility portion 4 and bent into hook-like portions as best seen in FIG. 2. Thus, the cutting blade 18 is pivotably connected at its ends to the supporting fingers 16 in the cut-out area 14. The utility portion 4 curves to a sharp point at end 20. The end 20 may be adapted for use in cutting or carving foodstuffs.

The blade 18 includes two limbs 22, 24 resembling a pair of lips and is generally of an extended oval shape having a longitudinal opening 26 extending along the length thereof as best shown in FIGS. 2 and 5. The blade 18 is shaped to curve in a lateral orientation and this curvature has the form of an open "U" as shown in FIGS. 6 and 7. In contrast to the conventional peelers, the blade 18 is shaped to curve also in the longitudinal direction as can be seen in FIGS. 1, 3, and 4 as discussed in more detail below. The blade 18 also has curved shoulders terminating in pins 28 by which the blade 18 is pivotably secured at its end to the supporting fingers 16. As shown in FIGS. 1 to 3, it can be envisaged that the blade 18 is thus pivotable between two extreme positions, the first position where the limb 22 abuts and lies coplanar with one side of the blade support 12 of the utility portion 4, and a second position where the limb 24 abuts and lies coplanar with the opposite side of the blade support 12.

The radius of the longitudinal curvature of the blade 18 of the peeler 1 is shallow, preferably in the region of 100 mm, although tests have revealed that curvatures in the range 30 to 150 mm are still particularly effective. Although as illustrated the blade 18 has a regular curved form with a single radius of curvature it is also possible for the blade 18 to be curved in a manner in which the radius of curvature is smaller at the end portions than it is towards the centre. The radius of the lateral curvature across the blade 18 is preferably in the region of 7 mm although a lateral curvature in the range of 3 to 20 mm has been found to be also effective. It will be appreciated that the provision of a blade 18 curved longitudinally allows a relatively closer interaction with most foodstuffs, since most foodstuffs have surfaces which are curved. Thus, a peeler according to the invention having a "dual-curved blade", although more difficult to produce, allows skin to be peeled considerably more efficiently. In particular, the strip of skin removed is substantially wider and thinner, leaving more of the foodstuff for use after peeling.

Figure 8:
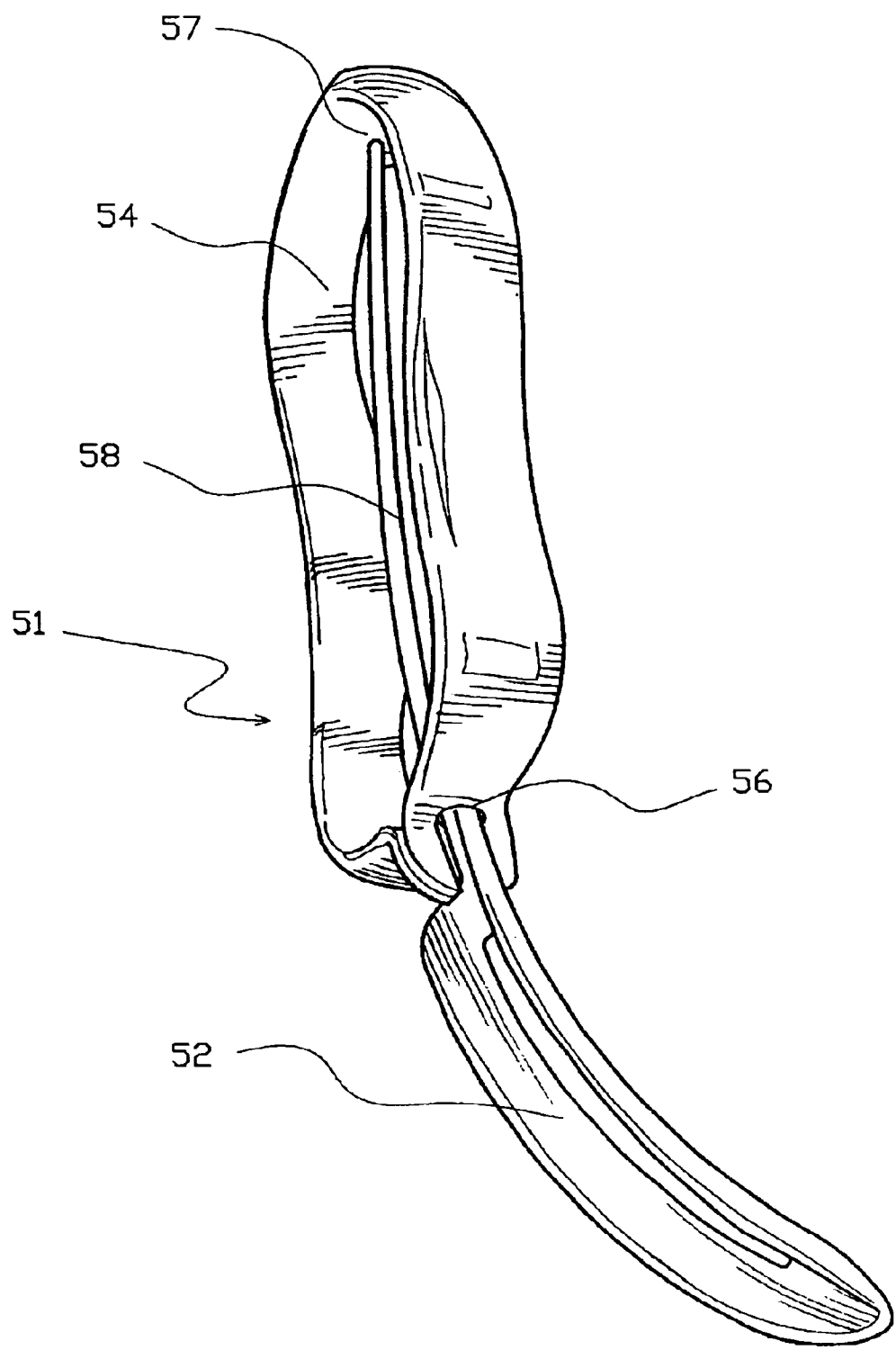
FIG. 8 is a perspective view of a culinary peeler comprising a cutting blade according to a second embodiment of the present invention.

A second embodiment of a cutting blade and a culinary peeler comprising such cutting blade according to the present invention is shown in FIG. 8, the peeler generally designated as 51. Similar to the peeler 1 in the first embodiment, the peeler 51 is provided with a "dual-curved" blade 52 curved in two directions. The blade 52 is however securely to a handle 54 of the peeler 51 rather differently. The shape of the handle 54 is also different.

The handle 54 is generally of elongate shape to fit the grip comfortable of a hand of a user, being of a construction which is common for simple peelers, being formed of a bent strip defining a hollow interior into which an extension of the blade 58 extends. The handle 54 is provided with two openings 56, 57 at opposite ends through which the extension 58 extends to allow limited pivotal movement of the blade 52.

Figure 9:
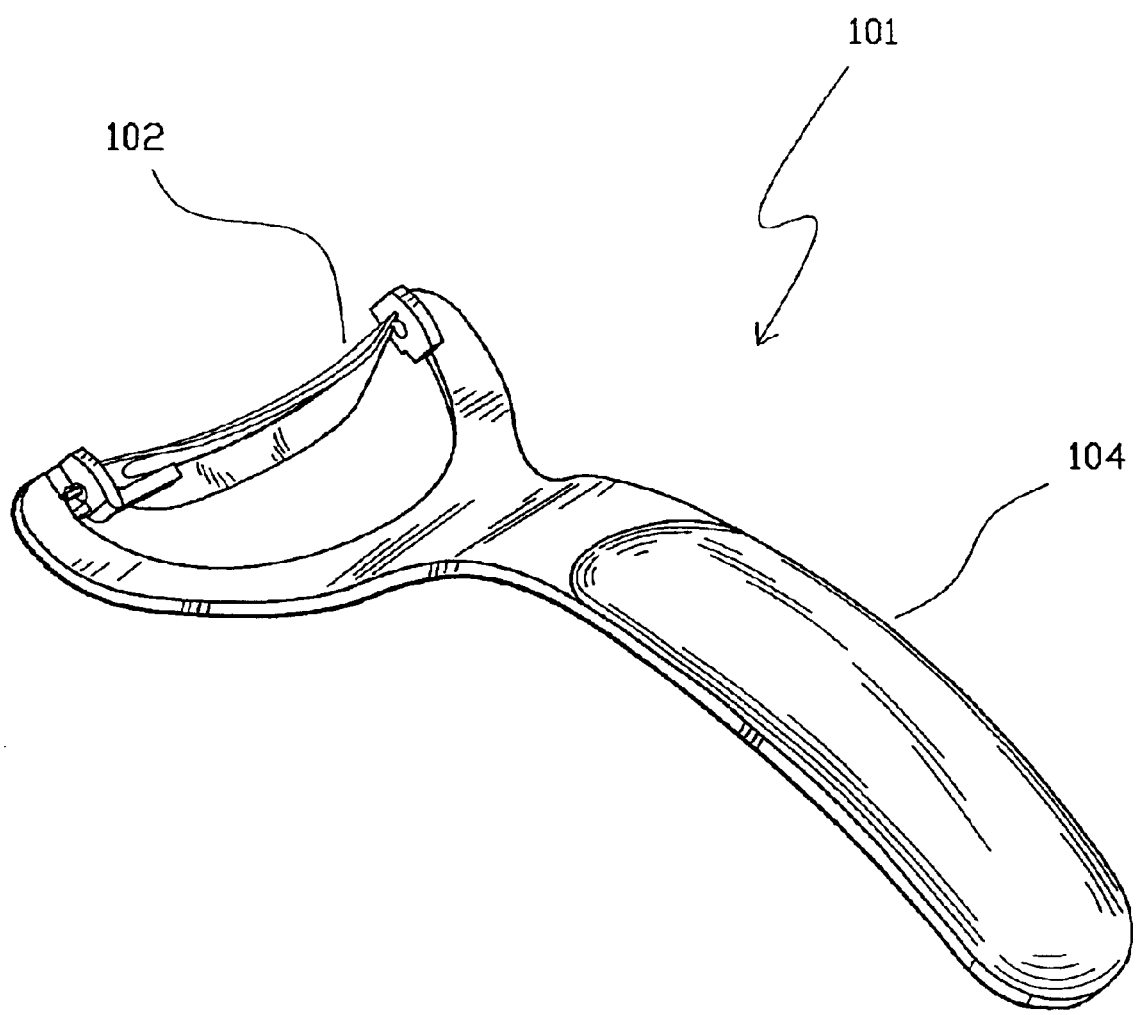
FIG. 9 is a perspective view of a culinary peeler comprising a cutting blade according to a third embodiment of the present invention.
Figures 10, 11:
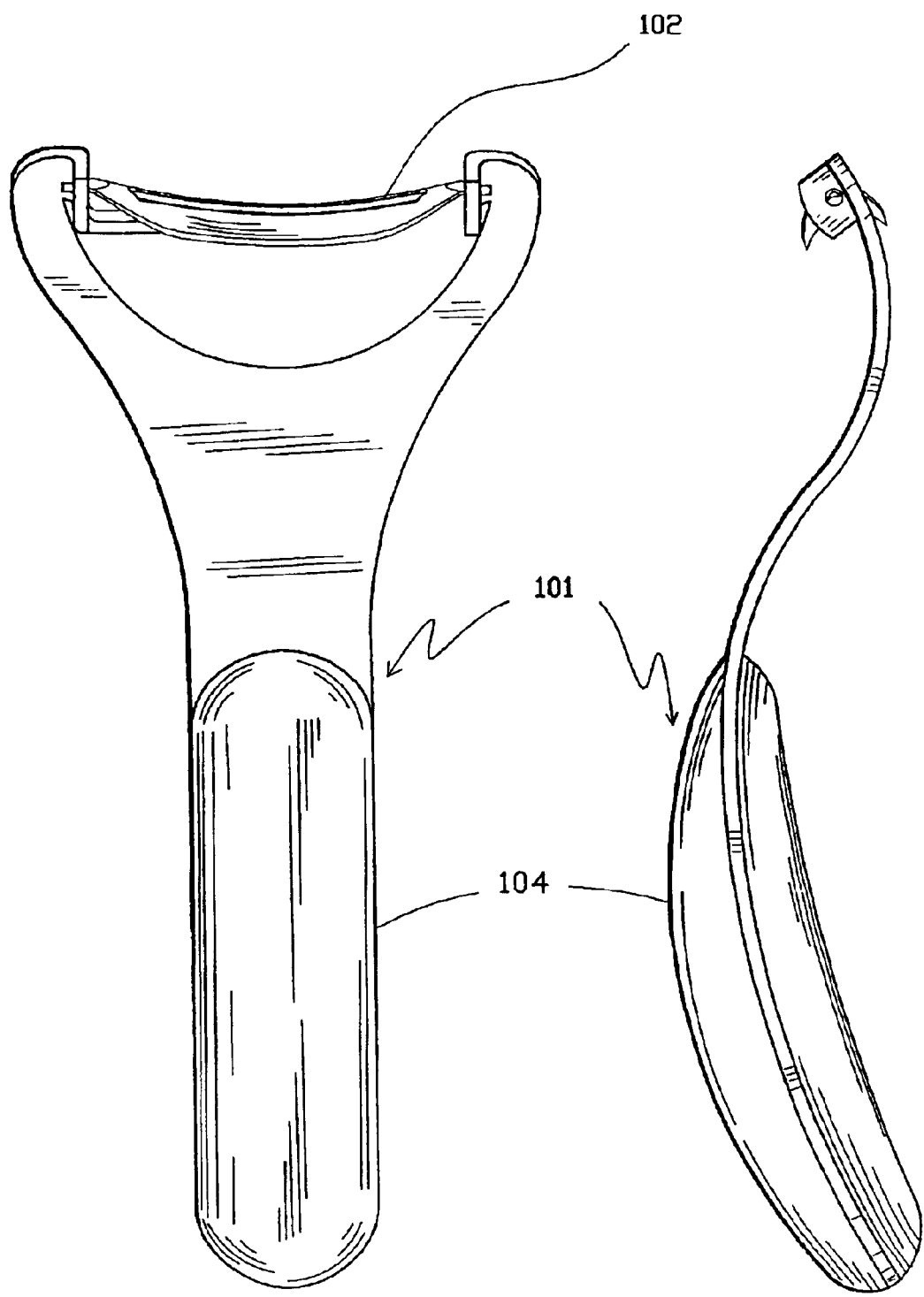
FIG. 10 is a top view of the peeler shown in FIG. 9.
FIG. 11 is a side view of the peeler shown in FIG. 10.

A third embodiment of a cutting blade and a culinary peeler comprising such blade is shown in FIGS. 9 to 11, the peeler generally designated as 101. Similar to the above-mentioned peeler 51, the peeler 101 is provided with a "dual-curved blade" 102 also curved in two directions. It is to be noted that a longitudinal axis of the blade 102 is generally perpendicular to a longitudinal axis of a handle portion 104 and also the direction of movement of the peeler 101 in use.

Although a blade is described and illustrated which is curved in the lateral direction, it is also possible for the blade to be of a V-shape in section. It is also possible particularly with a V-shaped blade, for there to be two longitudinal openings end having a sharp cutting edge adjacent each, as is well known in the art.

It is to be noted that while the examples of the blades 18, 52, 102 described above are adapted to allow some pivotal movement thereof relative to their handles 2, 54, 104, it is envisaged that a blade according to the present invention may be connected to a peeler of various other designs, for example where the blade is fixed to the handle.

To form the blade 18, 52, 102 according to the present invention, a sheet of material, preferably of metal, of suitable dimensions is cut from a flat blank to form the overall oval shape. The cut but flat sheet is then subjected to bending to give the required curvatures. The bending may be achieved by stamping the sheet material in a mould. The desired curvatures may be produced in one or multiple bending steps. It is to be noted that it actually requires more labor, skill and time to produce a peeler according to the present invention incorporated with a dual-curve blade than a conventional peeler. It has been identified that the dual-curved blade may be produced more precisely by bending it in more than one bending step. To ensure a higher durability of the blade, the sheet material is then hardened and sharpened in a conventional way. Once finished, the blade 18, 52, 102 is then assembled with the rest of the peeler.

What is claimed is:

1. A culinary peeler comprising a handle and a planar blade support extending therefrom, and an elongate blade bent or curved in its lateral dimension and having at least one longitudinal opening extending along its length with a sharp cutting region adjacent the opening, the blade is of curved form in its longitudinal direction, and the blade is pivotably secured at an end thereof to allow a limited pivoting about its longitudinal axis from a first position where one limb of the blade on one side of longitudinal opening lies coplanar with and abutting the blade support, and a second position where the opposite limb lies coplanar with and abutting the blade support.

2. A culinary peeler according to claim 1 wherein the at least one longitudinal opening has a pair of opposed sharp cutting regions on opposite sides of the opening.

3. A culinary peeler according to claim 2 wherein the blade has a lateral curvature of radius of about 7 mm.

4. A culinary peeler according to claim 1 wherein the radius of curvature of the blade in the longitudinal direction is in the range of 30 to 150 mm.

5. A culinary peeler according to claim 4 wherein the blade has a lateral curvature of radius of about 7 mm.

6. A culinary peeler according to claim 1 wherein the blade has a radius of curvature in the longitudinal direction of about 100 mm.

7. A culinary peeler according to claim 6 wherein the blade has a lateral curvature of radius of about 7 mm.

8. A culinary peeler according to claim 1 wherein the blade has a curved form with a lateral curvature of radius in the range of 3 to 20 mm.

9. A culinary peeler according to claim 8 wherein the blade has a lateral curvature of radius of about 7 mm.

10. A culinary peeler according to claim 1 wherein the blade has a lateral curvature of radius of about 7 mm.

11. A culinary peeler according to claim 1, wherein the blade has opposite ends and is pivotably secured at its opposite ends to allow a limited pivoting about its longitudinal axis.

* * * * *